United States Patent

König et al.

[11] Patent Number: 5,441,342
[45] Date of Patent: Aug. 15, 1995

[54] APPARATUS FOR KNEADING PORTIONED DOUGH PIECES

[76] Inventors: Helmut König, deceased, late of Graz, Austria; by Elisabeth König, legal representative, Ursprungweb 70, Graz, Austria, A-8045

[21] Appl. No.: 178,252
[22] PCT Filed: Jul. 10, 1992
[86] PCT No.: PCT/AT92/00095
§ 371 Date: Jan. 10, 1994
§ 102(e) Date: Jan. 10, 1994
[87] PCT Pub. No.: WO93/00820
PCT Pub. Date: Jan. 21, 1993

[30] Foreign Application Priority Data

Jul. 12, 1991 [AT] Austria ................. 1410/91
Jul. 12, 1991 [AT] Austria ................. 1413/91
Jul. 12, 1991 [AT] Austria ................. 1415/91

[51] Int. Cl.⁶ .............. B29B 1/06; A21C 5/04
[52] U.S. Cl. .................. 366/76.7; 99/289 D; 222/218; 366/77
[58] Field of Search ............ 366/69, 71, 72, 74, 366/76, 77; 222/218, 221; 99/289 D

[56] References Cited

U.S. PATENT DOCUMENTS

| | | | |
|---|---|---|---|
| 3,733,058 | 5/1973 | Konig | 366/76 |
| 4,210,402 | 7/1980 | Schroper | 366/76 |
| 4,580,903 | 4/1986 | Ihler | 366/76 |
| 4,684,040 | 8/1987 | Jonovice | 222/218 |

Primary Examiner—Robert W. Jenkins
Attorney, Agent, or Firm—Salter & Michaelson

[57] ABSTRACT

Figure 1:
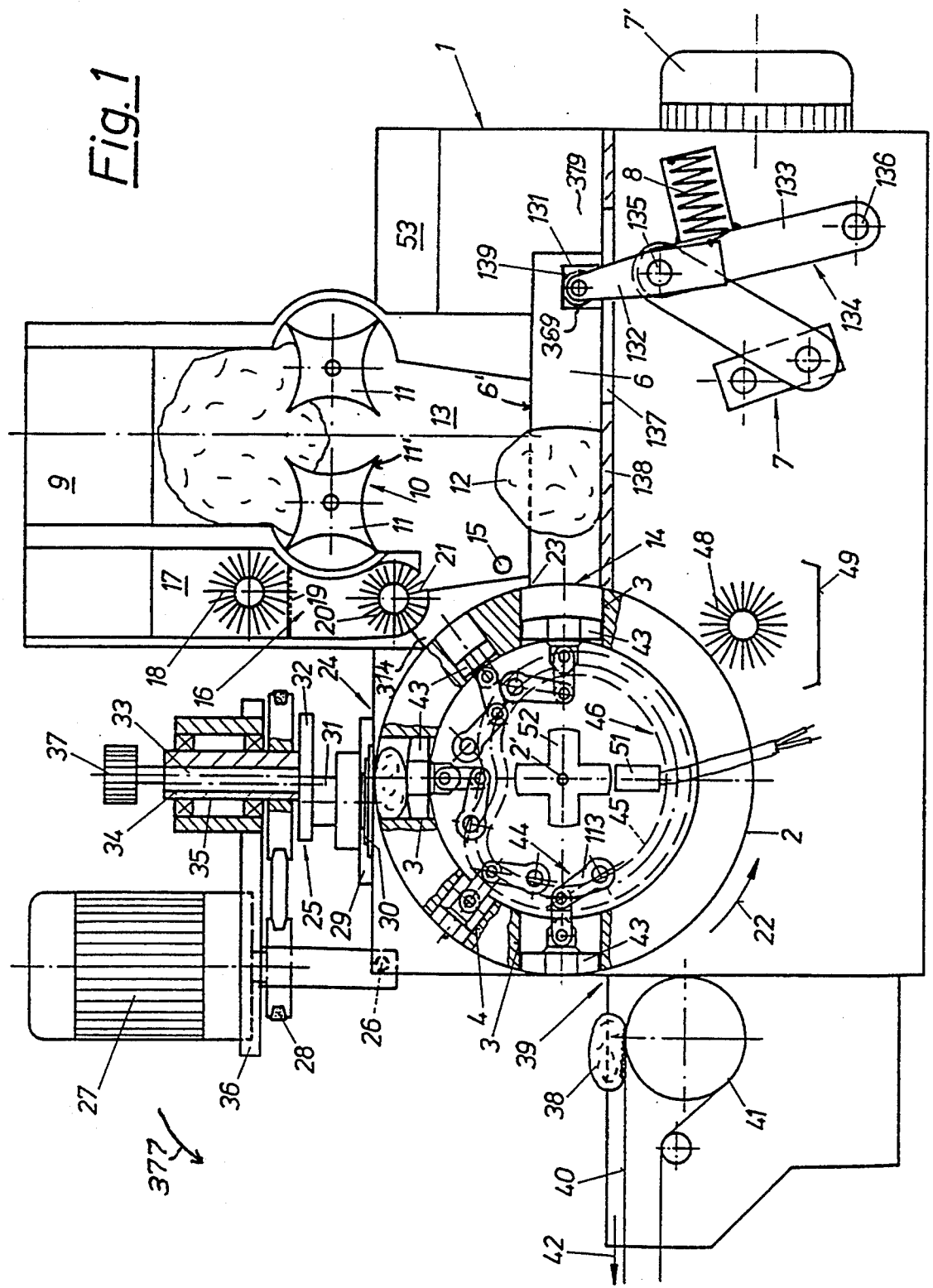

An apparatus for kneading portioned dough pieces comprises a drum (2) rotating around a horizontal axis and being provided on its periphery with alternatively disposed receiving openings (3,4) of different size for the dough to be kneaded. In each receiving opening (3,4) a piston (43) is guided in radial direction and a restricted guidance (48) is provided for the adjustment of these pistons. A change-over means (50) enables one to position always only one of the two sizes of the receiving openings (3,4) below the kneading device (25), so that this kneading device is common of all sizes of the receiving openings (3,4). Thereby, dough pieces having a large range of weight can be kneaded (FIG. 1).

32 Claims, 12 Drawing Sheets

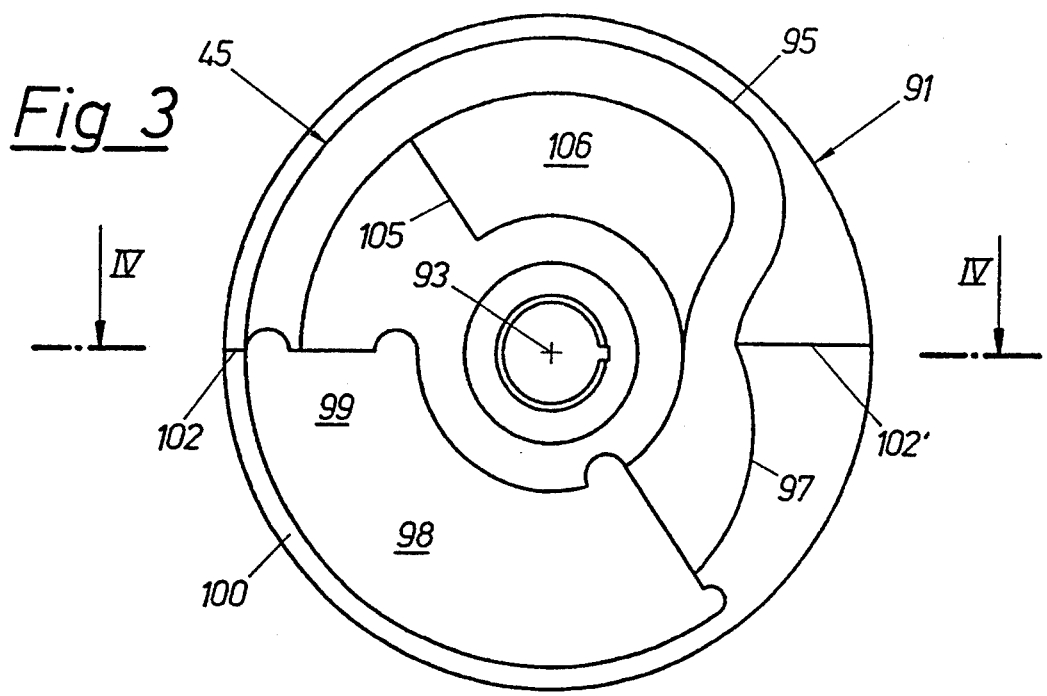
Fig_3
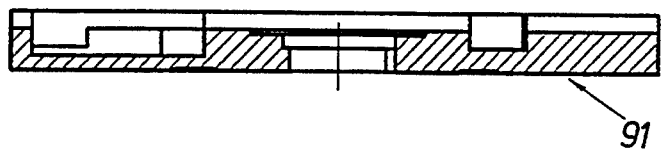
Fig. 4
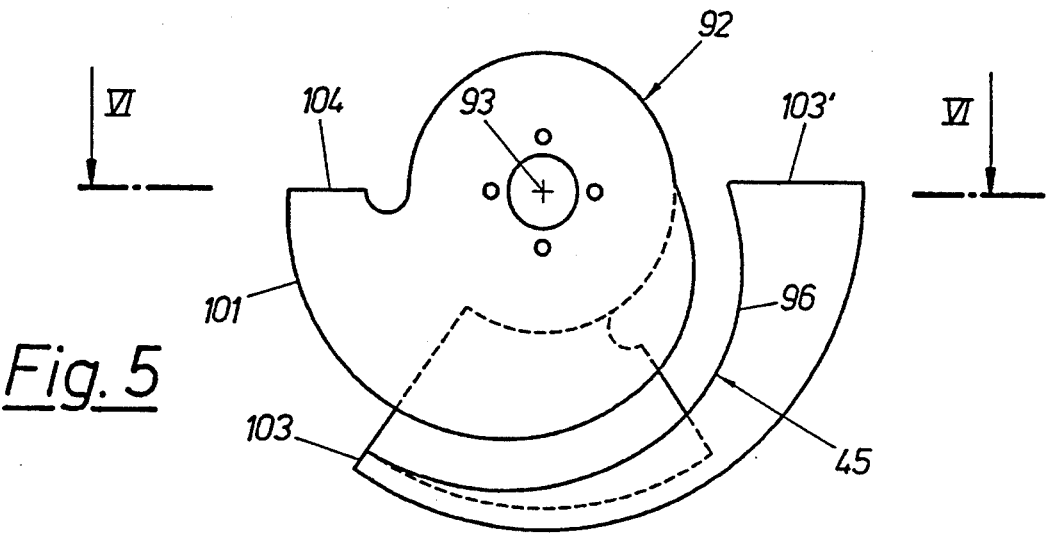
Fig. 5
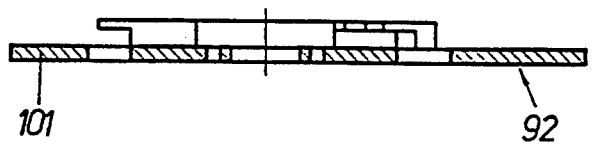
Fig. 6

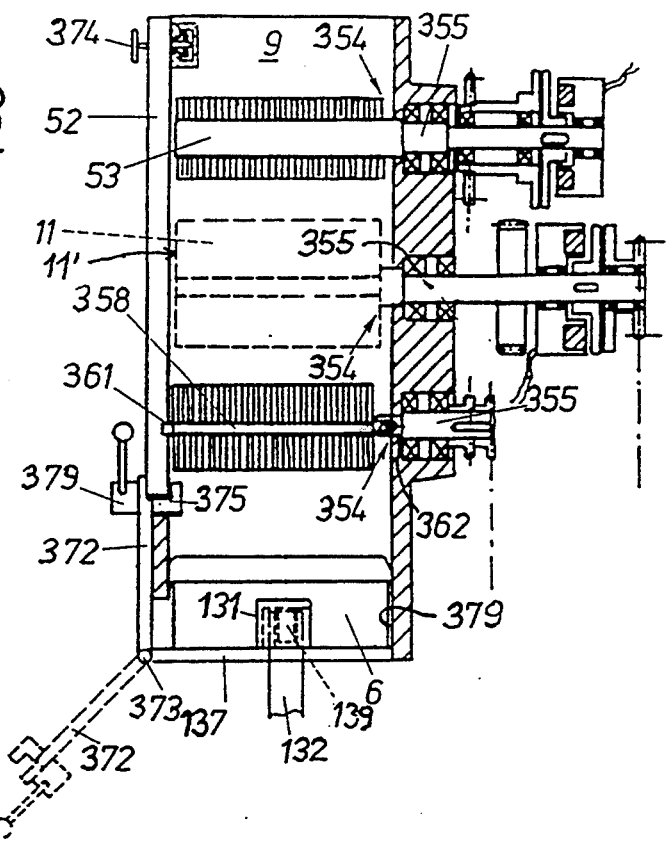
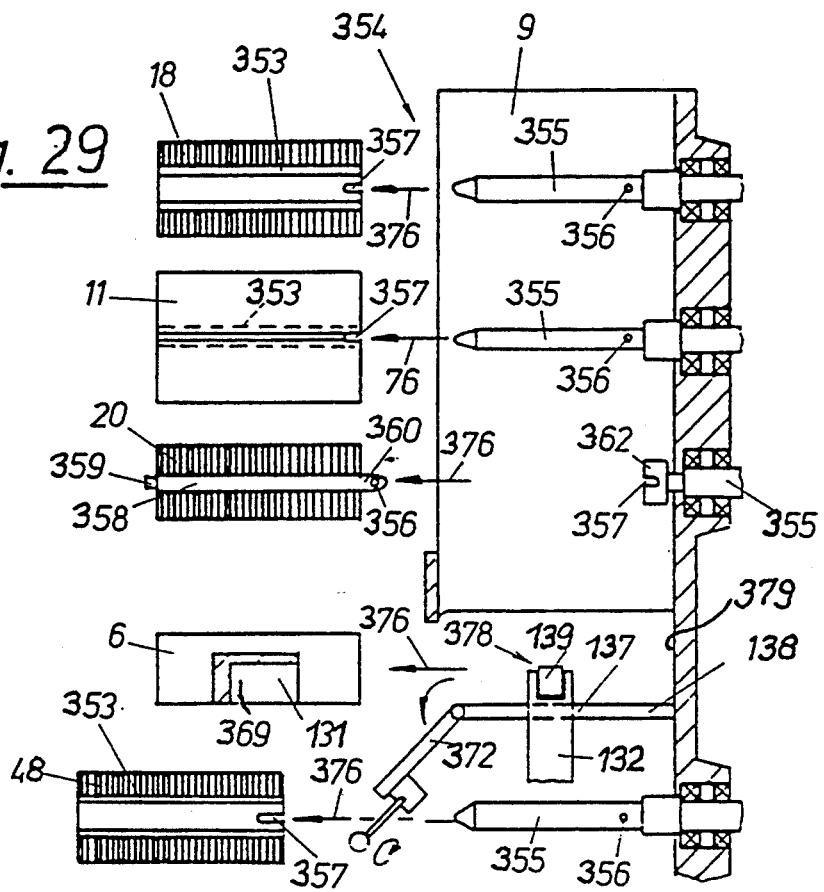

APPARATUS FOR KNEADING PORTIONED DOUGH PIECES

The invention relates to an apparatus for kneading portioned dough pieces in which dough, if desired already portioned, is filled at a filling station, particularly a portioning station, into receiving openings on the periphery of a drum that is stepwisely rotatable by a drive means around a horizontal axis, which receiving openings are spaced apart from each other in equal distances along the periphery of the drum, wherein the dough pieces positioned within the receiving openings are kneaded by a kneading tool that is positioned on the periphery of the drum at a kneading station displaced in direction of rotation of the drum with respect to the filling station and is driven by an excenter pin to a circular motion, and thereafter are ejected from the receiving openings at a deposit station displaced relative to the kneading station in direction of rotation of the drum by pistons displaced in the receiving openings by means of a guide means, and wherein preferably the volume of the amount of dough introduced into the receiving openings can be selected by varying the position of the pistons within the receiving openings at the filling station.

Such apparatus are known (for example AT-PS 341 970). The known apparatus has four rows of receiving openings disposed in equal distances around the periphery of the drum, that is displaced with respect to each other for an angle of 90°, wherein the stepwise drive of the drum causes a rotation of the drum for also 90° per step. Within the known apparatus, a portioning station is disposed at the one side of the drum, in which station the dough is pressed into the receiving openings by means of a pusher member and is portioned by means of a shearing edge when the drum moves again. In the region of the summit of the drum the kneading station is positioned at which the dough piece is brought into a ball-like shape. At the other side of the drum the deposit station is positioned at which the dough pieces are ejected from the receiving openings. By the guide means the pistons can be retracted at the portioning station for sucking-in the dough. By varying the amount for which the pistons are retracted at the portioning station, the volume of dough that can be accommodated by the receiving opening, can be varied, what means an adjustment of the volume or, respectively, weight of the portioned dough pieces. However, at the known apparatus the range of the weight adjustment cannot be chosen too great, because the relative amendment of the starting position or, respectively, end position of the pistons within the receiving openings at the portioning station influences the circumstances at the kneading station and also at the deposit station.

The invention has at its object to increase the range of variation for the weight of the dough portions without that the circumstances at the kneading station and at the ejecting station of the dough pieces are deteriorated. The invention solves this task by the features that the receiving openings are disposed in at least two different sizes alternating with each other in peripheral direction of the drum and that the steps of rotation movement of the drum correspond to the distance of two neighbouring receiving openings of equal size, measured in peripheral direction of the drum, wherein a change-over means for rotation of the drum for the distance of two different receiving openings is associated to the drive means for rotation of the drum, so that in the intervals between the drum steps always receiving openings of equal size, however selectable size, face the filling station, the kneading station that is common for all sizes of the receiving openings, and the deposit station, and that the radius of the circular movement of the kneading tool can be varied by changing the eccentricity of the eccentric pin. The provision of different sizes of the receiving openings of the drum ensures the possibility to treat two dough volumes that are different from the beginning, noting that, provided that the initially described principal of the volume amendment at the filling station or, respectively, at the portioning station is retained, there results the initially mentioned variation range for each one of the two amounts. Therefore, if the specifics of the apparatus are suitably chosen, in comparison to the known construction the variation range can be doubled if two different sizes of the receiving opening are used, if three different sizes are used, it can be trebled, and so on. As a rule, in practice two sizes are sufficient.

By the change-over means one can change from one size to the other size without any problem. It is further of advantage that the same kneading tool is used for all sizes of the receiving openings, so that no changes of the position of the kneading tool are necessary, since the change-over means ensures that always the desired size of the receiving opening is fed to the kneading tool. However, since the invention starts from the finding that for different volumina of the dough portions to be kneaded the kneading process must correspondingly be adjusted, the invention provides for a corresponding adjustment of the eccentricity of the circular movement of the kneading tool. Thereby a large range of the weight of the dough pieces to be kneaded can be kneaded with a constant favourable result, and as a rule smaller dough portions require greater eccentricities of the circular movement of the kneading tool at the kneading process and vice versa. Also different qualities of the dough to be kneaded can be considered by this adjustment of the movement of the kneading tool to the respective size of the receiving opening.

From the DE-A 3,438,258 it is known to provide a portioning drum with receiving openings of different size in order to obtain dough pieces having a great and low weight. This known apparatus, however, serves only for dividing into dough pieces, therefore for portioning purposes, and nothing can be learned therefrom, where and how the dough pieces should be kneaded.

According to a preferred embodiment of the invention, the drive means for the drum has a catch cooperating with a row of notches corresponding to the steps of the drum, which catch is particularly loaded by a spring, wherein this catch can be uncoupled by the switchover-means for certain times, in particular for a fraction of a step of the drum corresponding to the number of sizes of the receiving openings. This results in a particular simple, reliable construction. Within the spirit of the invention, the change-over means may comprise a tappet acting on the catch and guided within the framework, in particular against the action of a spring.

As a rule, the provision of receiving openings of different size on the drum causes a corresponding multiplication of the number of the receiving openings distributed around the circumference of the drum. Thus, the four rows of receiving openings of the initially described known apparatus would result into at least eight rows when applying the invention. This may lead to the initially described problems in connection with guiding the pistons, in particular it may happen that the pistons that are disposed at the deposit station and at the preceding row of openings, when seen in direction of rotation of the drum, are not all in the completed advanced position what results in a danger of injury for the operator, because he may grasp into the openings and may be injured when the drum rotates again. In order to avoid this disadvantage, according to a further embodiment of the invention the construction is so chosen that the pistons are guided on a curved path of the guide means that can be changed relative to the drum at least in the intervals of the advance movement of the drum, and that this curved path has at least two sections that can be adjusted relative to each other and are disposed on members of the guide means that can be adjusted relative to each other.

Thereby, by a corresponding adjustment of the members carrying the sections of the guide means, it can always ensured that all pistons in the region of the deposit station reach the outmost position, that means, that their front surfaces are flush with the surface of the drum. But also at the kneading station advantages are obtained, because there the kneading process can be changed at choice without that one must consider the changes made at the portioning station. Within the spirit of the invention there are several possibilities for this relative adjustment of the members carrying the sections of the curved path. According to the invention, the arrangement can be made such that these members can be rotated relative to each other around a common center, or these members may be articulated at each other at the periphery and may be spreadable by means of a central toothed wheel work or the like.

Within the initially described known construction the times which are at disposal for the advancement of the drum and for the kneading process are always equal to each other. This, however, may be of disadvantage for certain sizes or kinds of dough pieces positioned in the different receiving openings, since the inventive apparatus provides for a broad variation range with respect to the use. In order to avoid this disadvantage, according to a preferred embodiment of the invention the construction may be so chosen that the drive means for the drum and for the guide means comprises a curved path from which the advance movements of the drum and of the guide means as well as the return movement of the guide means relative to the drum are derived, the duration of each movement step of the drum being shorter than the intervening intervals. By this the time being at disposal for the kneading process, is elongated at the expense of the time needed for the advancement of the drum, without that the number of dough pieces produced per time unit must be decreased. This ensures in all cases a perfect kneading result at a high number of kneaded dough portions produced per time unit.

Figure 2:
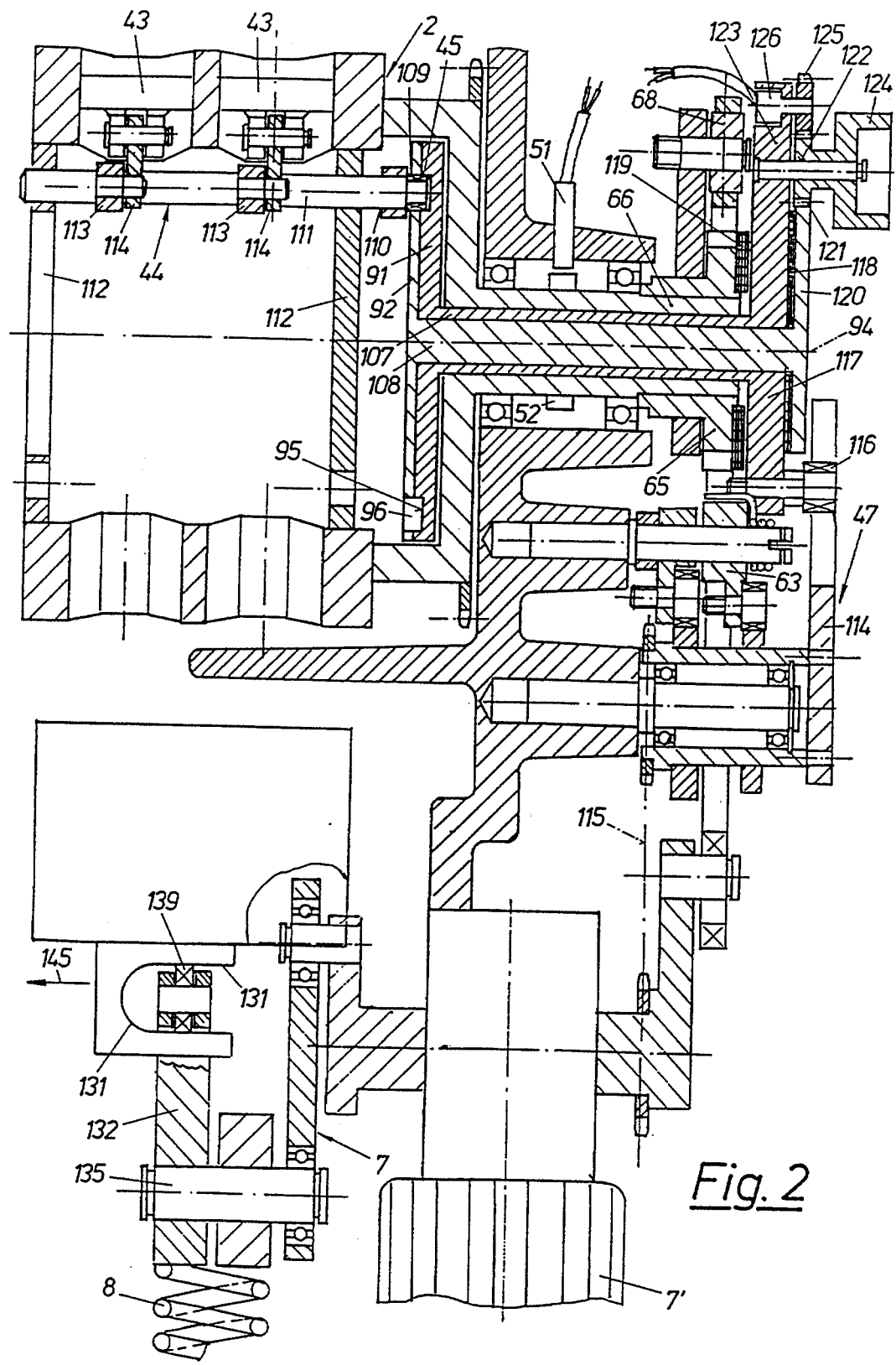
Figure 7:
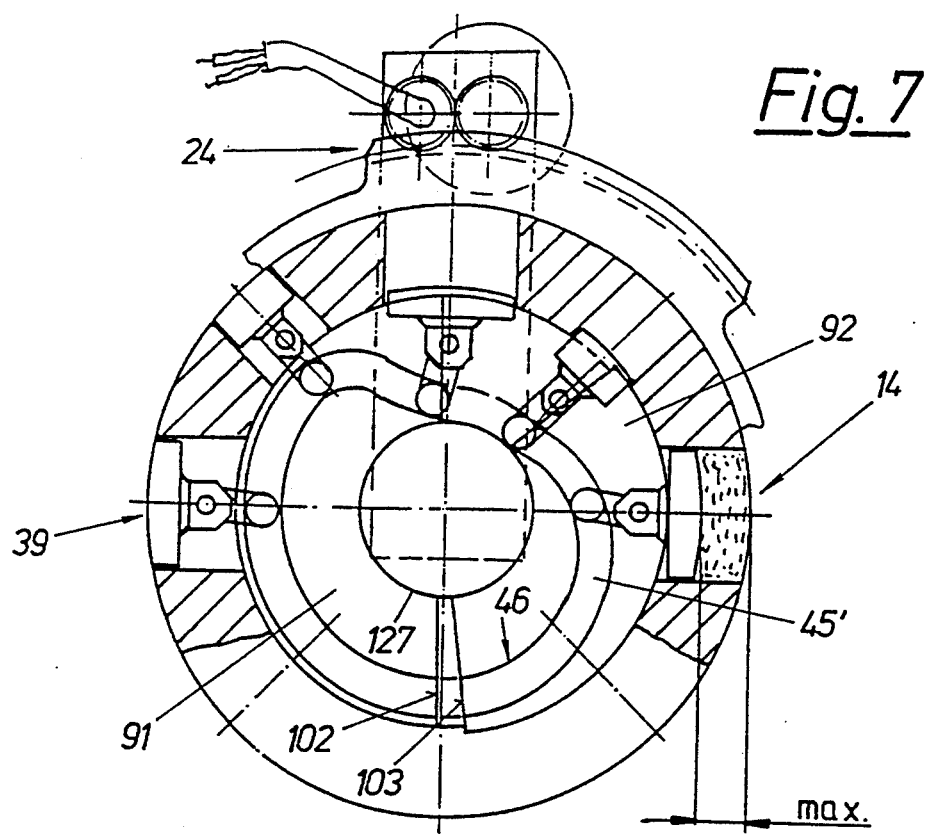
Figure 8:
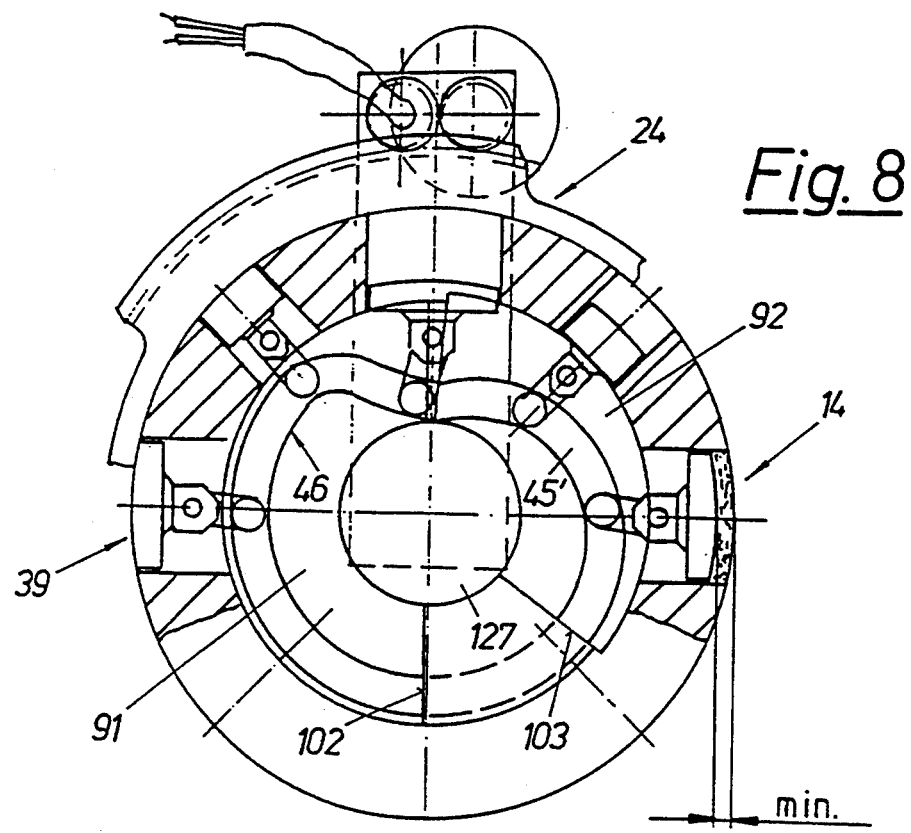
Figure 9:
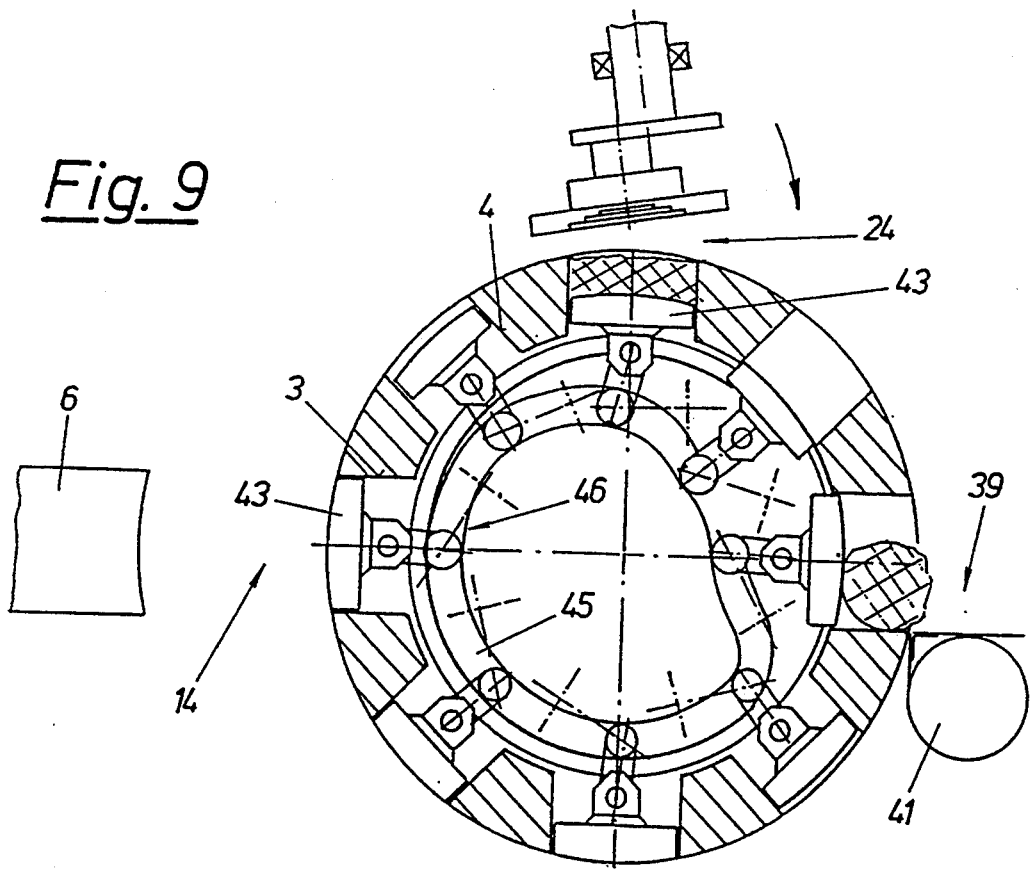
Figure 10:
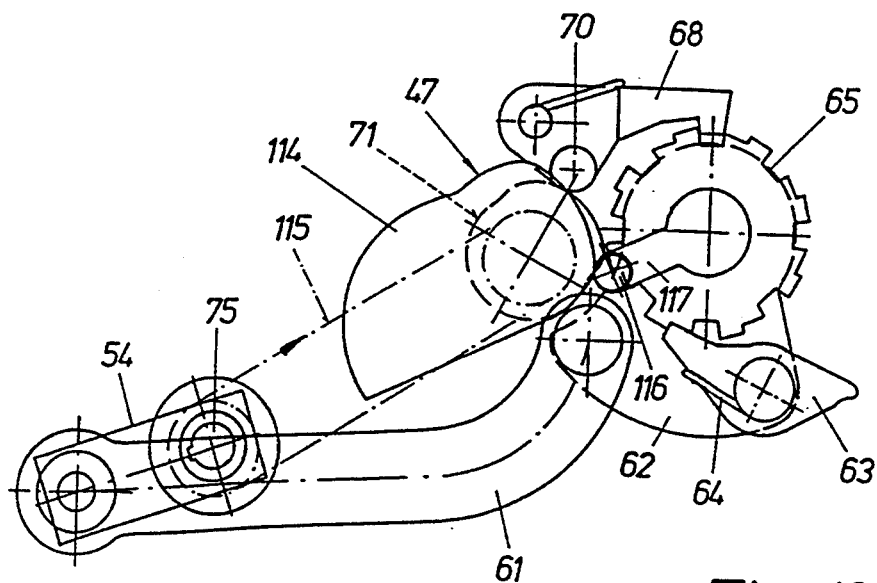
Figure 11:
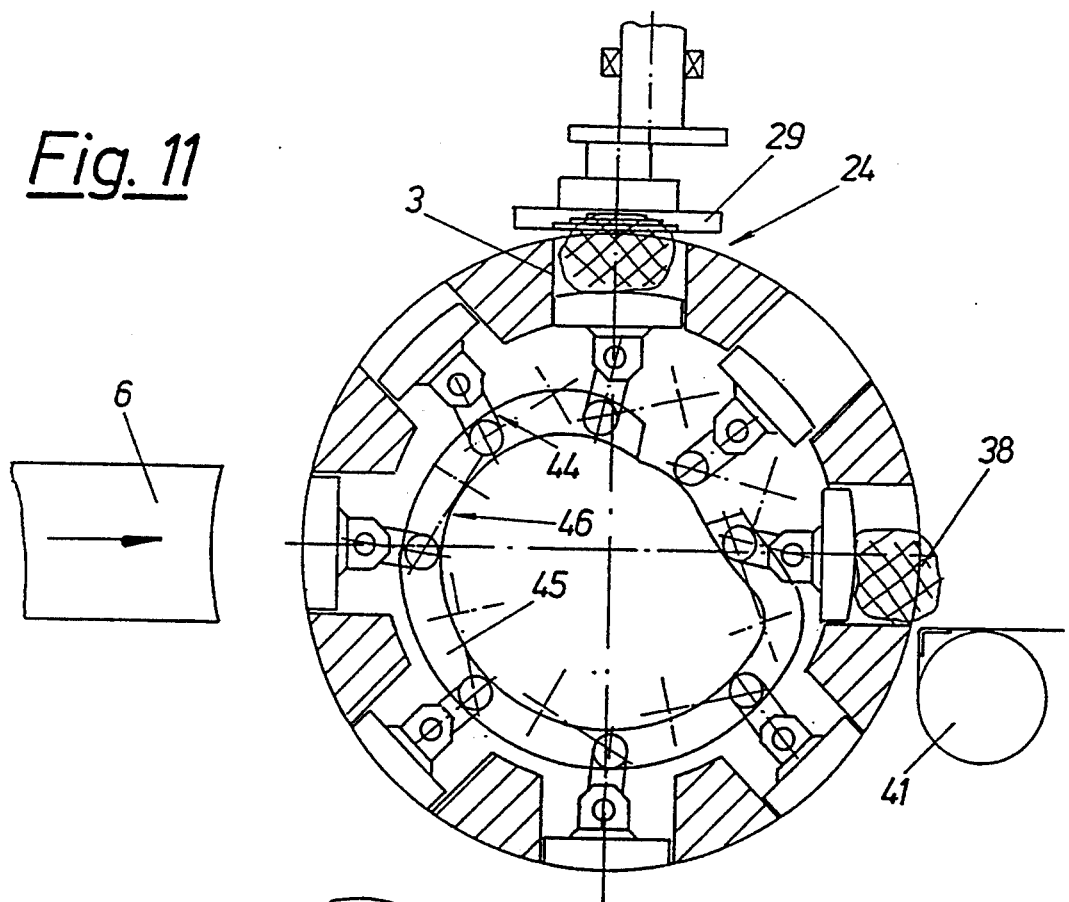
Figure 12:
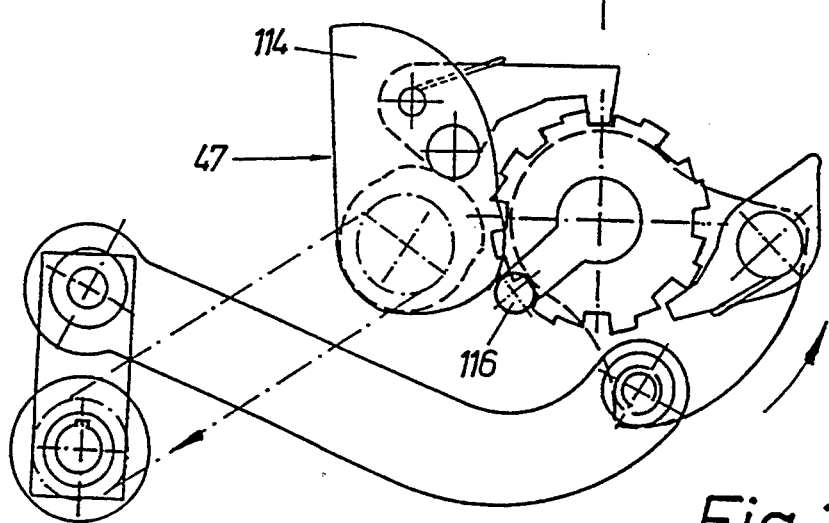
Figure 13:
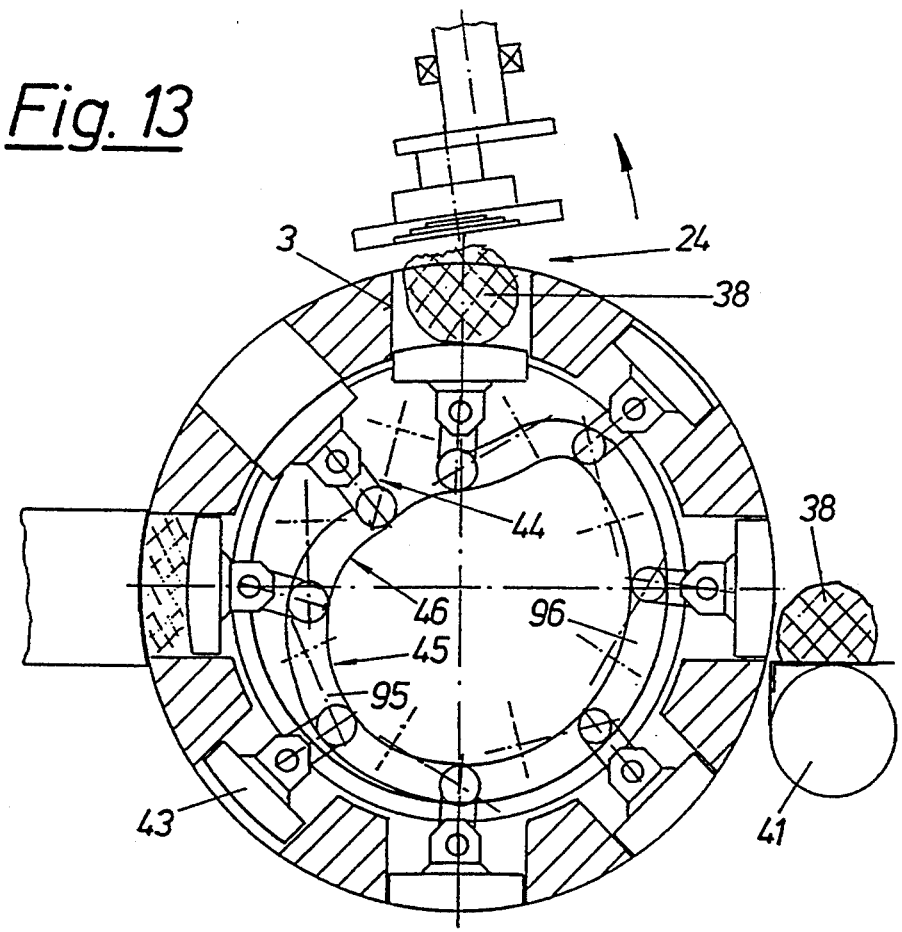
Figure 14:
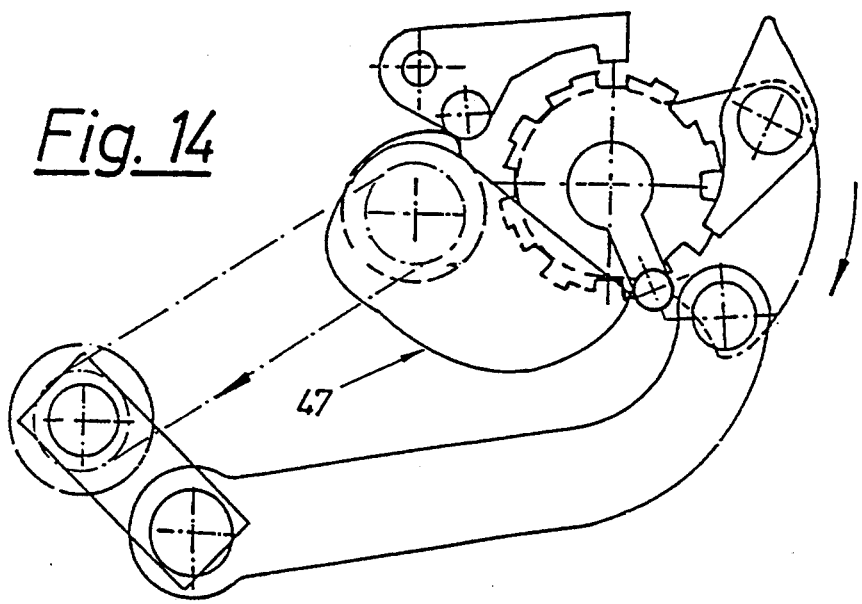
Figure 15:
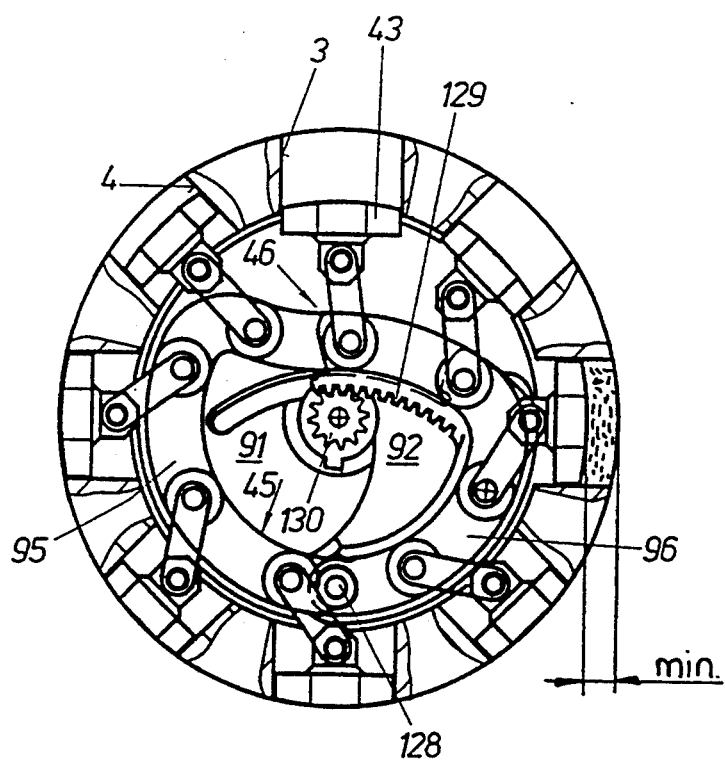
Figure 16:
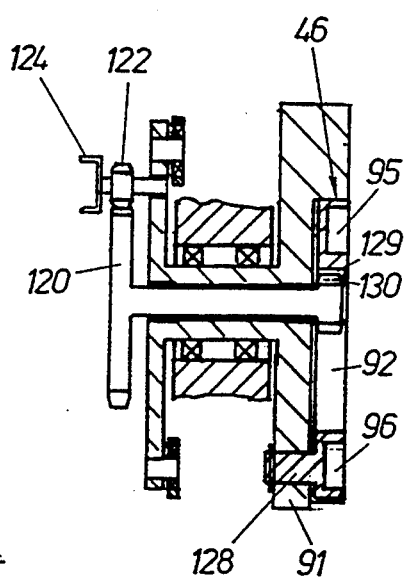
Figure 17:
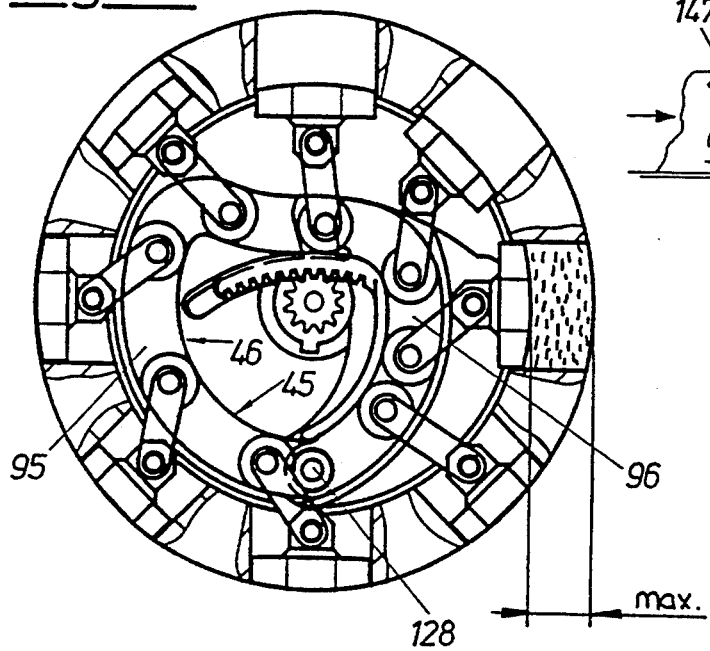
Figure 27:
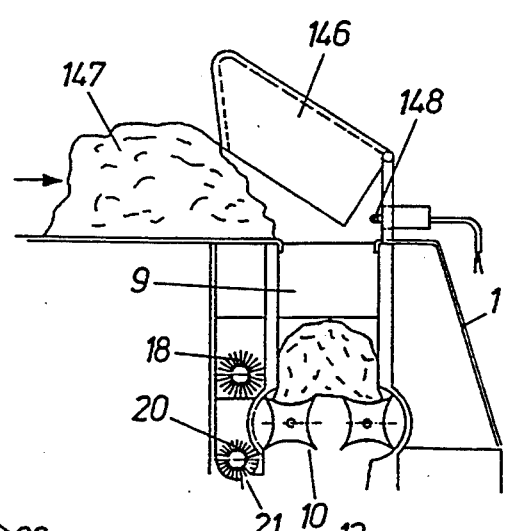
Figure 18:
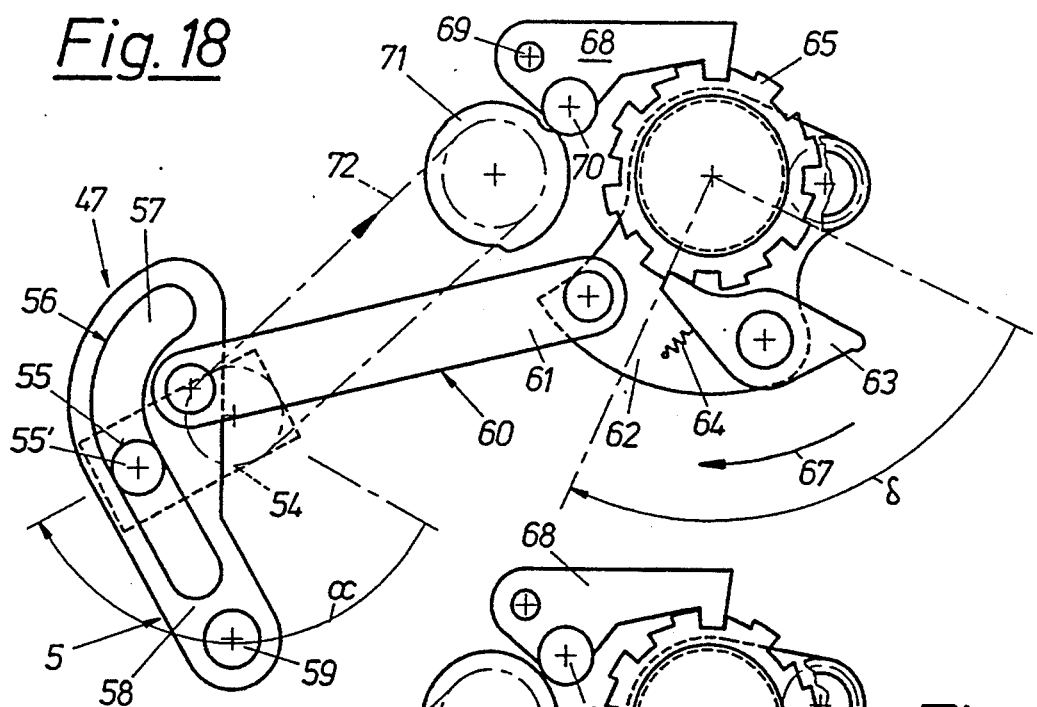
Figure 19:
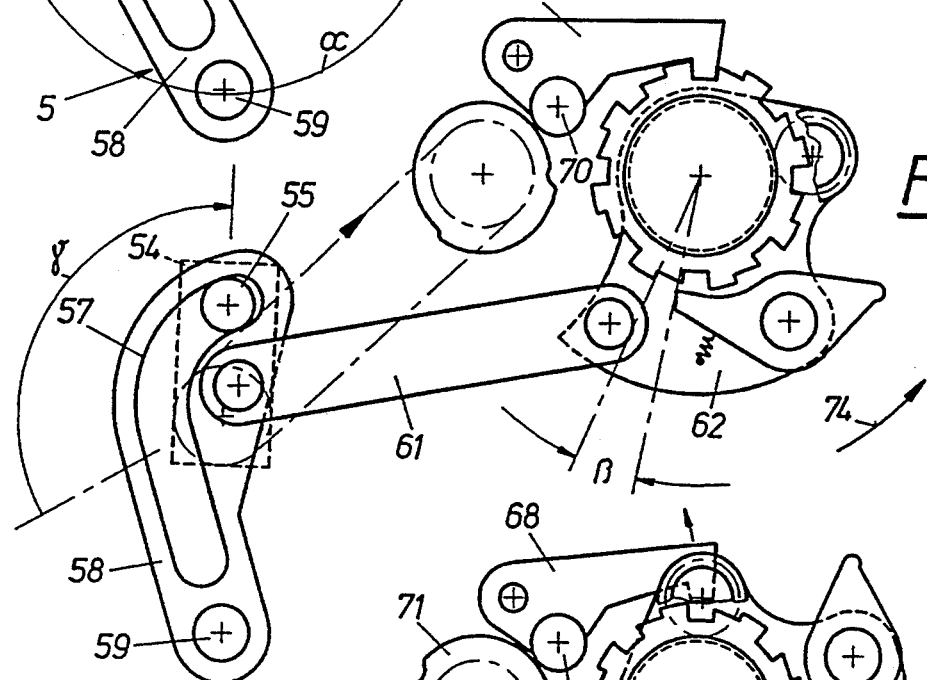
Figure 20:
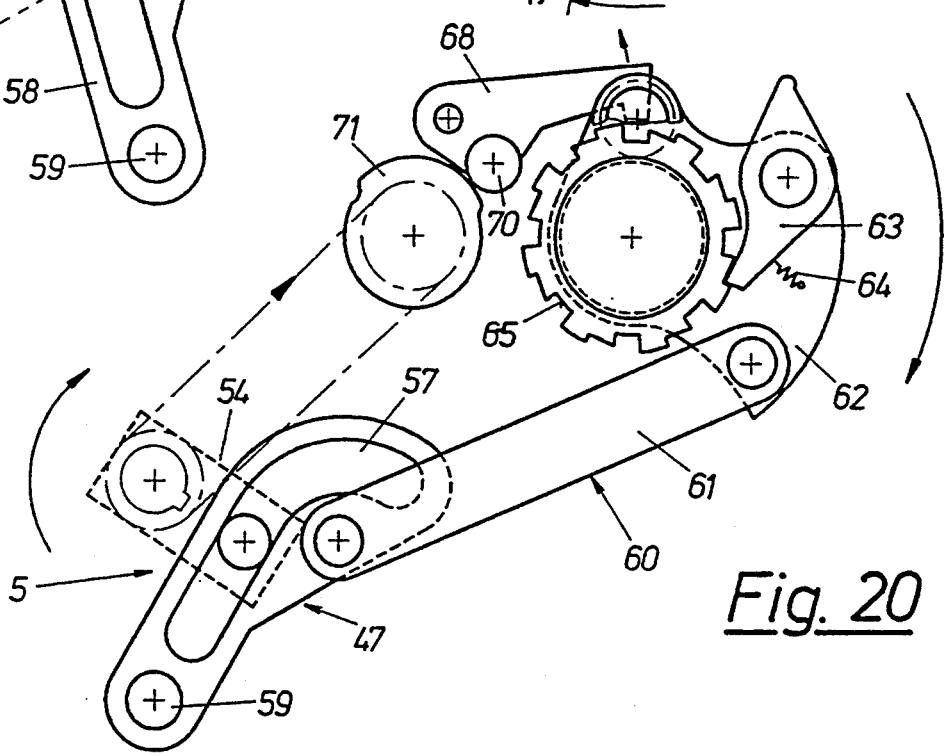
Figure 21:
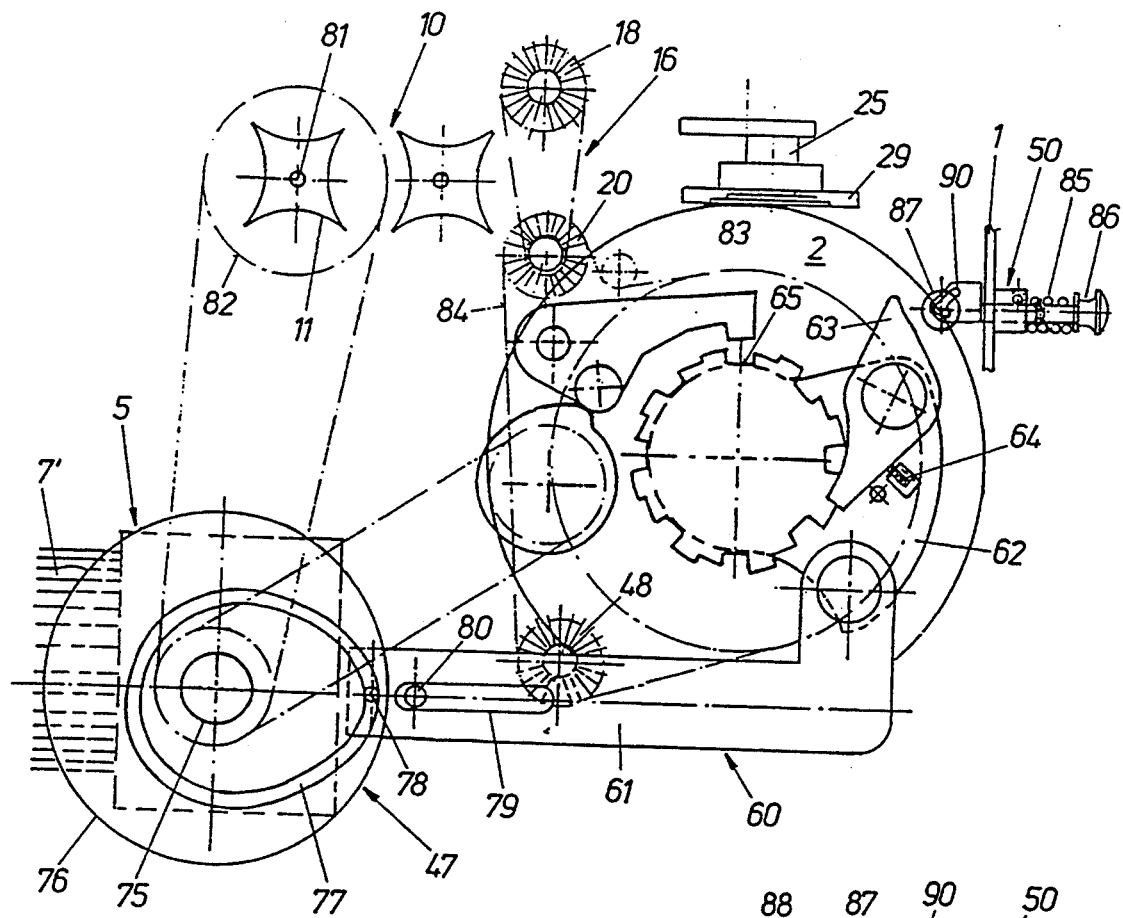
Figure 22:
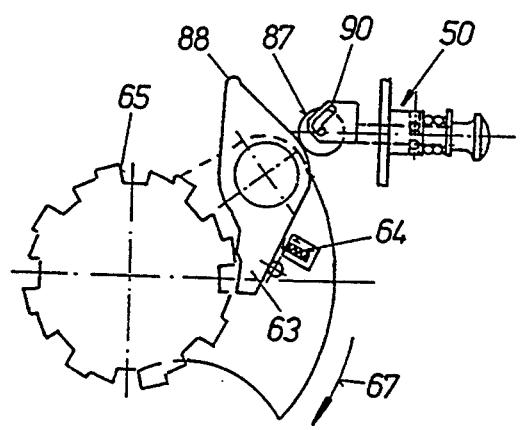
Figure 23:
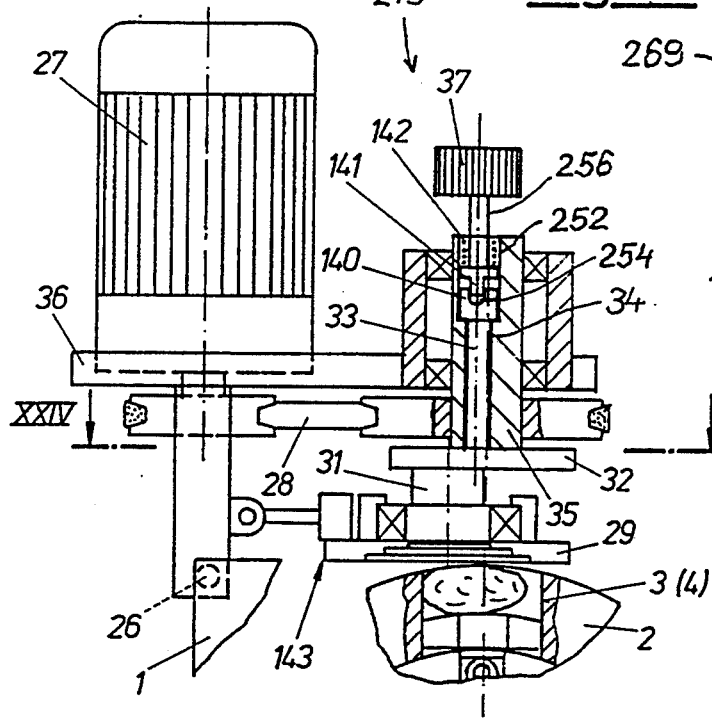
Figure 24:
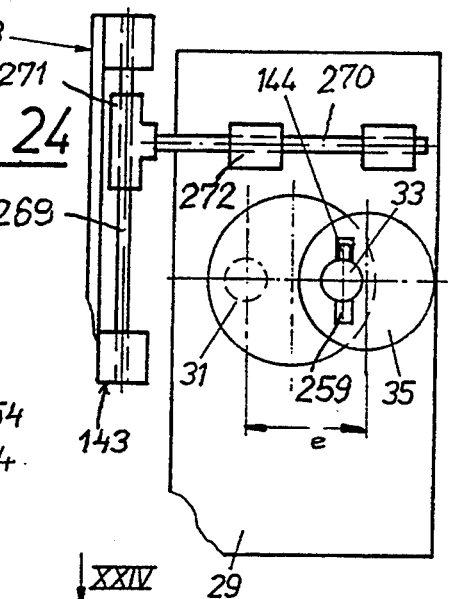
Figure 25:
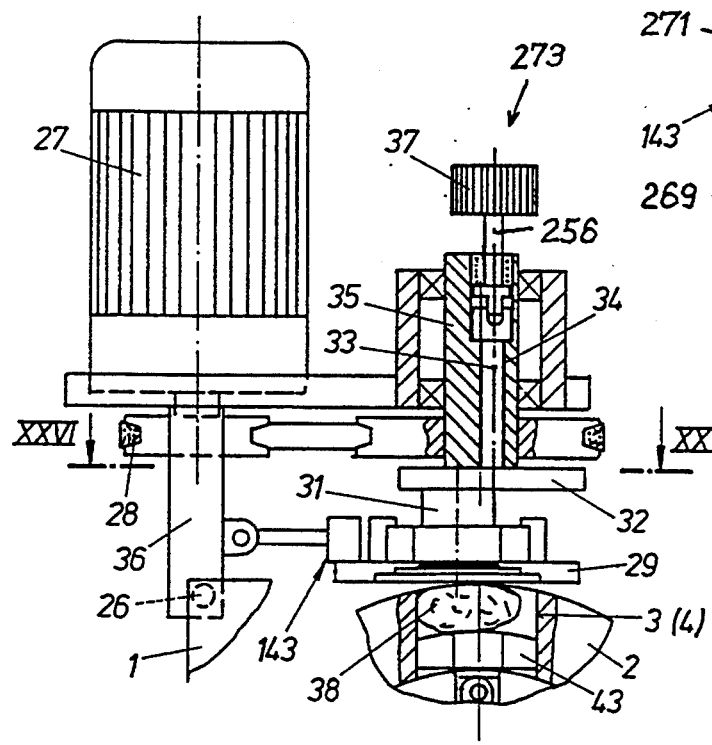
Figure 26:
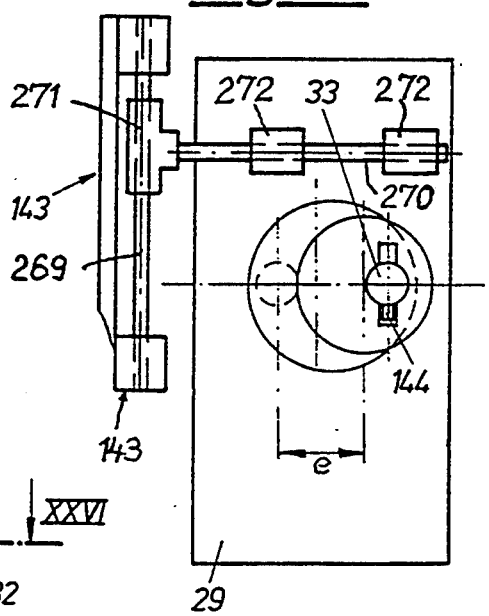

Further features and advantages of the invention can be seen from the description of examplative embodiments of the apparatus according to the invention, which embodiments are schematically shown in the drawings. FIG. 1 shows a vertical section through the apparatus. FIG. 2 is a vertical section through the axis of the drum, taken perpendicularly to the section plane of FIG. 1, in a larger scale. FIGS. 3 and 5 show the two members of a two-part guide means, always seen in axial view. FIGS. 4 and 6 are sections taken along the lines IV—IV or, respectively, VI—VI of FIG. 3 or 5, respectively. FIGS. 7 and 8 show a guide means composed of the two members according to FIGS. 3 to 6, in two different adjustments. FIGS. 9, 11 and 13 show the guide means in three subsequent phases of the kneading process and FIGS. 10, 12 and 14 show the associated drive means in the three corresponding moments of operation. FIGS. 15 and 17 show an embodiment variant for a two-part guide means. FIG. 16 shows in a section a detail of FIG. 15. FIGS. 18 to 20 show embodiment modifications to the FIGS. 10, 12 and 14. FIG. 21 shows a modified embodiment in its essential elements in section and FIG. 22 shows a detail of FIG. 21 in another operation position. FIG. 23 shows in a larger scale a section through the adjustment means for the kneading tool and FIG. 24 is a section taken along the line XXIV—XXIV of FIG. 23. FIGS. 25 and 26 are sections similar to the FIGS. 23 or 24, respectively, however in a different adjustment. FIGS. 27, 28 and 29 each show a detail in a vertical section.

Within the embodiment according to FIG. 1, a drum 2 is bearingly supported for rotation around a horizontal axis 2' in a framework 1. The drum 2 has on its circumference receiving openings 3 or 4, respectively, of different size for the dough to be kneaded, the larger receiving openings 3 being distributed alternatively with the smaller receiving openings 4 over the periphery of the drum 2 in equal distances. Suitably these receiving openings are provided in rows extending parallel to the axis 2' of the drum. The drum is stepwisely driven by a drive means 5 (FIG. 2, 18 to 20) so that at each step of the drum motion always one receiving opening 3 or 4, respectively, reaches a portioning station 14, at which the dough is pressed into the corresponding receiving opening by means of a press-in tool 6' formed by a pusher member 6. The pusher member 6 is reciprocably guided in the framework 1 in a guidance 379 (FIG. 1, 28, 29) and is reciprocably moved by a crank mechanism 7 driven by the main motor 7'. A tension spring 8 is inserted into the crank mechanism 7 and avoids that the dough is unduly squeezed at the advance movement of the pusher member 6. The dough to be portioned is filled into a filling shaft 9 and is pre-portioned by a preportioning device 10 consisting of pre-portioning means 11' in form of two star rollers 11 positioned at the same level within the filling shaft 9 and rotating in inverse sense around horizontal axes and driven intermittently in dependence from the dough volume 12 provided within a chamber 13 positioned below the star rollers 11, from which chamber the dough 12 is pressed-in by the pusher member 8 and thereby is displaced in the chamber 13. If sufficient dough is at disposal within the chamber 13, a sensor 15 is actuated during this dough displacement, which sensor transmits a pulse to a control means for driving the star rollers 11. For example, this sensor may be formed by a photo-electric barrier or by a proximity sensor sensitive to the approach of moist mass, for example a capacitive sensor, or by a rod bearingly supported for swivel motion in the chamber 13 above the path of movement of the pusher member 8, which rod is lifted by the displaced dough. If there are no pulses transmitted by the sensor 15—if desired for a adjustable number of strokes of the pusher member 8—then causes the control means that dough is supplied into the chamber 13 by the star rollers 11 either for a selected time or till the sensor 15 is actuated again.

The dough volume 12 present in the chamber 13 is flouted at its pressed-in side by flouring device 18. For this, a dosing brush rotates in a flour chamber 17 and throws flour through a dosing grid 19 having adjustable grid openings onto a distributing brush 20 that throws the flour through an opening 21 into the chamber 13. The drive means for this flouring device 16, in particular for its dosing brush 18, may be controlled in the same manner by the sensor 15 as the drive means for the pre-portioning device 10.

The dough pressed into the respective receiving opening 3 or 4 is sheared off by a shearing edge 23 when the drum 2 rotates again in direction of the arrow 22, and thereby the real portioning is done. After a rotation of the drum 2 for 90°, the dough piece present in the receiving opening reaches a kneading station 24 positioned in the region of the upper drum summit. There, a kneading device 25 is provided on the framework 1 and is driven by a motor 27 via a V-belt drive 28, the kneading device comprising a kneading tool 29 in form of a plate that at the kneading process moves in a circular motion relative to the neighbouring receiving opening and is provided on its side facing the drum 2 with stepwisely formed cavities 30 (see also FIG. 23 to 26). The kneading tool 29 is bearingly supported for rotation on an eccentric pin 31 fixed to a disk 32 provided on the lower end of a second eccentric pin 33. This further eccentric pin is rotatably inserted into a seat 34 formed by an eccentric bore of a driving shaft 35 driven by the V-belt drive 28 and bearingly supported for rotation in a fixing device 36 carrying also the motor 27 and being fixed for pivotal motion around an axis 26 on the framework 1, so that the kneading device 25 can be swivelled off from the framework 1 for cleaning purposes or the like. The second eccentric pin 33 can be rotated within the driving shaft and can be fixed in its rotation position and carries on its upper end a tiller 37 for fixable adjustment. Thereby, the radius of the circular movement of the kneading tool 29 can be varied also during operation so that the kneading effect can be adjusted to the present circumstances, in particular to the size and the quality of the dough piece. This will be described more in detail.

The completely kneaded dough pieces 38 are ejected from the receiving openings 3 or, respectively, 4 at a deposit station 39 and are placed onto a conveyor belt 40 that is guided around a deflection roller 41 disposed near the drum 2. In order to ensure a reliable transition of the dough piece 38 to be ejected, the conveyor belt 40 may be prematurely driven, that means, it starts its motion in direction of the arrow 42 before the dough piece is ejected. This ejection is caused by a radial outward movement of a piston 43 guided in each one of the receiving openings 3,4. All pistons 43 are guided along a curved path 45 of a restricted guidance 46 by linkage means 44 so that a rotation of this curved path 45 with respect to the drum 2 causes a radial movement of the piston 43 in the respective receiving opening, either inwardly or outwardly. This relative rotation is made by a drive means 47 described later on in detail. The curved path 45 is substantially so formed that, when the curved path 45 makes its relative rotation during the intervals of motion of the stepwise drum motion, the pistons 43 are retracted at the portioning station 14 in order to produce a suction effect onto the dough to be portioned. At the kneading station 24, the piston 43 is further retracted in order to provide more space for the dough piece that little by little assumes a ball-like shape by the kneading process. At the deposit station 39, however, the pistons 43 are shifted outwardly until the periphery of the drum and thereby the dough pieces 38 are ejected from the receiving openings 3 or 4.

If necessary, rests of dough adhering on the drum are stripped off by a cleaning brush 48 and are thrown onto a collecting cup 49.

Always one single size of the receiving openings 3 or, respectively, 4 is effective. In order to change from the large receiving openings 3 to the small receiving openings 4 or vice versa, a change-over device 50 (FIG. 21, 22) is provided, the function thereof is nearer described later on. The respective adjusted size of the openings can be sensed by a sensor means 51 (FIG. 1) cooperating with a transmitter cross 52 fixed on the shaft of the drum and associated to the larger receiving openings 3. If the sensor means 51 during the motion interval of the drum 2 senses a neighbouring protrusion of the transmitter cross 52, the larger receiving openings 3 are effective, otherwise the smaller receiving openings 4. The evaluation of the signals transmitted by the sensor 51 can be made by electronic means positioned in a switch box 53, in the same way as the control of the drive means of the pre-portioning device 10 and, respectively, or of the flouring device 18.

It is convenient to make the length of time at disposal for the kneading process of each dough piece 38 at the kneading station 24 longer than that length of time that is required for an advance step of the drum 2, that means, for example, to bring a receiving opening 3 or 4 from the portioning station 14 to the kneading station 24 or, respectively, from this to the deposit station 39. For this, the FIGS. 18 to 20 show suitable drive means 5 for the drum or, respectively, 47 for the restricted guidance 46. By the main motor 7' (FIG. 1) a crank 54 is rotated via a gear means, which crank carries a rotatable roller 55' bearing supported on a pin 55 and guided in a curved slot 57, forming a curved path 56, of a swivelling lever 58 bearingly supported in the framework 1 of the apparatus for swivel motion around a horizontal axis 58 and forming a member of a linkage means 60 serving for the motion of the drum 2 or, respectively, of the restricted guidance 46. This linkage means 60 has a rod 61, the one end of which is hinged to the swivelling lever 58 and the other end of which is hinged to a rocker arm 62 rotatably mounted on the shaft of the drum 2 and connected for rotation with the restricted guidance 46, for example by means of a shaft intersecting hollow shaft ends of the drum 2 that are connected to the two side walls of the drum 2. The rocker arm 62 carries a catch 63 pressed by a spring 64 against a row of notches 62, particularly a notched collar connected for rotation with the shaft 66 of the drum 2. During the advance movement of the drum 2 the rocker arm 62 is pivoted via the drive means 5 in direction of the arrow 67 (FIG. 3) and the catch 63 engages a notch of the row of notches 65 and thereby the drum 2 is carried along. During the intervals of motion of the stepwise drum motion, a further catch 68 bearingly supported for pivotal motion around an axis 69 in the framework 1, engages a notch of a row of notches 65 and thereby prevents the drum 2 from rotation. The catch 68 carries a roller 70 bearingly supported for rotation on the catch and guided along the periphery of a cam disk 71 that is rotated by the main motor 7' via a chain drive 72. The shape of the periphery of the cam disk 71 determines when the catch 68 is lifted out of the row of notches 65 and thereby makes the drum 2 free for rotation.

The drive means 47 for the rotation of the restricted guidance 46 (FIG. 2) disposed on the side of the drum 2 and serving for adjustment of the pistons 43, is also driven by the main motor 7' via the crank 54 (FIG. 18 to 20) and utilizes also the linkage means 60. For this, a shaft carrying the restricted guidance 46 and for simplification's sake is assumed to be a single shaft, is connected for rotation with the rocker arm 62. Each pivotal movement of the rocker arm 62, may it be during the advance of the drum in direction of the arrow 22 (FIG. 1) or during the interval of motion of the drum in the inverse direction, therefore causes a corresponding swivel motion of the restricted guidance 46 around the axis of this shaft.

The circumstances, in particular the shape of the curved slot 57 in the swivelling lever 58, are so chosen that shorter periods of time result for the movement of the drum (advancement from station to station) than for the rotation of the restricted guidance 46 during the stillstand of the drum 2. Since the drive means 5, 47 are positioned on the other side of the drum 2 as the view side of FIG. 1, the positions of the members shown in FIGS. 18 to 20 are side-inverted, so that the portioning station 14 is disposed at the left side and the deposit station 39 at the right side. FIGS. 9, 11 and 13 are correlated to FIGS. 18 to 20 and clearly show the relative position of drum 2 and restricted guidance 46 as well as the movement of the pistons 43 caused thereby.

FIGS. 18 and 9 show the circumstances before the start of the kneading process. It can be seen that during an angle of rotation $\alpha$ of the crank 54 of about 120° the drum 2 is advanced for 90° and this by an harmonic acceleration without bump, and also harmonic decelerating. The piston 43 positioned at the kneading station 24 (FIG. 9) assumes a middle position, corresponding to the volume of dough portioned at the portioning station 14. As soon as the advancement of the drum 2 is terminated, the cam disk 71 allows the catch 68 to rest into the row of notches 65, whereby the drum 2 is blocked against rotation. Now the kneading process starts at the further rotation of the crank 54 (FIG. 11, 19). Thereby the rod 61 is shifted to the right (FIG. 19) and swivels the rocker arm 62 in direction of the arrow 74, however at the beginning for a small amount only (angle $\beta$) although the crank 54 rotates during this time for a substantially greater angle $\alpha$ which again amounts to about 120°. This relative small swivel motion of the rocker arm 62 causes an also small rotation of the restricted guidance 46, whereby the piston 43 positioned at the kneading station 24 at the start of the kneading process is retracted for a comparatively small amount in its receiving opening 3. For this initial phase of the kneading process, therefore, about one third of the total time period of the cycle is at disposal or about as much time as for the advance of the drum (angle $\alpha$, FIG. 18).

The shape of the slot 57 in the swivelling lever 58 is coordinated with the shape of the curved path 45 of the restricted guidance 46, so that the speed of retraction of the pistons 43 necessary at the kneading station 24 has the desired amount.

During further rotation of the crank 54 (FIGS. 13,20), following the angle $\delta$ (FIG. 19) there is an accelerated swivel motion of the rocker arm 62 and therefore a quicker rotation of the restricted guidance 46, what causes a quicker retraction of the piston 43 in its receiving opening 3 or 4 in the end phase of the kneading process. FIGS. 13 and 20 show the circumstances after termination of the kneading process when the catch 68 is lifted off by the cam disk 71 so that the drum 2 is made free for rotation in direction of the arrow 22. The drum is advanced for 90° (angle $\delta$ in FIG. 18) and the cycle is started again.

As it is shown in FIGS. 18 to 20, the shortened relation between the time for movement of the drum and the kneading time is represented by the shape of the cam disk 71. Its elevated cam portion that causes the catch 88 to swivel off during the advancement of the drum, extends only over about a third of the periphery of the cam disk 71, whereas two thirds of this periphery correspond to the time that is at disposal for the kneading process.

A variant thereto is shown in FIGS. 21 and 22. The driven shaft 75 of the motor 7' Carries as disk 78 on which an endless curved loop 77 is fixed in which a pin 78 is guided that is mounted on the rod 61 of the linkage means 60 by which the drive means 5, 47 for the drum 2 or, respectively, for the restricted guidance 48 are connected to the rocker arm 62. The rod 61 has a slot 79 into which a pin 80 engages that is fixed to the framework 1 and carries the rod 61 for pivotable and shiftable motion. By the eccentric arrangement of the curved loop 77 with respect to the output shaft 75, analogously the same effects are obtained as this has been described with respect to FIGS. 18 to 20.

FIG. 21 shows also the drive means for the pre-portioning device 10 and for the flouring device 16. As chain wheel is mounted on the output shaft 75 and drives via a chain a chain wheel 82 mounted on the shaft 81 of the one star roller 11. This chain wheel 82 is coupled by a magnetic coupling to the shaft 81, which coupling is controlled by the sensor 15 (FIG. 1) or, respectively, via the electronic means disposed within the switch box 53 in the manner described. The two star rollers 11 are coupled to each other by means of pinions so that they rotate synchronously having opposite senses of rotation.

For the flouring device 16, the drive is derived from a chain wheel 83 that is mounted on the shaft of the drum 2 and drives via a chain 84 as well the flouring device 16, and, more particularly, its lower distributing brush 20, as the cleaning roller 48. The two brush rollers 18,20 of the flouring device 16 are coupled to each other by a chain drive, the chain wheel associated to the dosing roller 18 being connected via a magnetic coupling to the shaft associated to this dosing brush 20. Also this magnetic coupling may be controlled by the sensor means 15, if desired with an adjustable delay time or, respectively, via the electronic means positioned within the switch box 53.

The change-over device 50 for changing over from the smaller receiving openings 4 to the larger receiving openings 3 or, respectively, vice versa, comprises a push-button 86 shiftably guided in the framework 1 against the action of a spring 85, which push-button carries on its inner end a roller 87 cooperating with the catch 63 mounted for swivel motion on the rocker arm 62. If a change-over is desired, the push-button is pressed in the position shown in FIG. 22 against the action of the spring 85 so that during the advance movement of the drum (arrow 67) the roller 87 engages the catch 63 and thereby lifts off this catch against the action of the spring 84. Thereby, any carrying along of the drum 2 during the swivel motion of the rocker arm 62 in direction of the arrow 87 is interrupted so long until a nose 88 engages the roller 87 and thereby presses the push-button 86 out of a ball stop notch 89 so that the push-button is moved back into its starting position (FIG. 21) under the action of the spring 85. Then, the catch 63 engages in the next following notch of the row of notches 65 under the action of the spring 64.

If the push-button 86 is actuated during a relative swivel between the restricted guidance 46 and the drum 2, so that the rocker arm 62 is swivelled opposite to the direction of the arrow 67, then the nose 88 of the catch 63 presses the roller 87 back along a guidance 90 so that the roller 87 can get out of the way. As soon as the advance of the drum starts, the roller 87 slides again in the guidance 90 downwardly into the position shown in FIG. 21 and, therefore becomes effective, as described above.

In order to make it possible to change the restricted guidance 46 on a treating station for the dough pieces 38, for example on the portioning station 14 in order to change the weight of the dough pieces, without that this change influences the circumstances at the kneading station 24 or at the deposit station 39, each restricted guidance 46 consists of at least two members that are adjustable relative to each other. For simplification's sake, the examplative embodiments shown in the drawing show only two such members 91, 92 (FIG. 2 to 8 and 16, 17), however, also three or more such members may be provided. In the embodiment according to FIGS. 2 to 8, the two members 91, 92 can be swivelled around a common center 93 which coincides with the axis 94 (FIG. 2) of the drum 2. Each one of the two members 91,92 carries a section 95 or, respectively, 96 of the curved path, which two sections complete each other in each relative swivel position of the two members 91, 92 so that all pistons 43 are always reliably guided in radial direction and, therefore, cannot escape neither outwardly nor inwardly. As a rule, the two members 91,92 overlap each other partially (FIG. 2), the amount of this overlapping is determined by the relative swivel of the two members. The said possibility for variation is obtained by the fact that on the member 91 (FIG. 3,4) the section 95 of the curved path 45 has an enlargement 97, which section would allow an oscillation of the pistons if it would be important alone for guiding the pistons 43. However, this oscillation is avoided by the fact, that this enlargement 97 is overlapped by the section 96 of the curved path 45 of the member 92 (FIG. 5,8), so that this section becomes of importance for the restricted guidance of the pistons 43. In an analogous manner, the section 98 of the member 92 acts as a guidance for the pistons 43 in that section 98 of the member 91, in which the curved path 45 is interrupted. In at least one section of the curved path 45, it is limited also by both member 91, 92, and this in a sector 99 which constitutes that part of the sector 98 that corresponds to the end of the curved path 45 in the member 91 that merges into the sector 98 and is not enlarged. There, the curved path 45 is confined on its outer side by a peripheral fin 100 of the member 91, which fin is positioned on the outer side of the sector 98. On the inner side, the confinement is constituted by a plate-shaped section 191 of the member 92, which section has a spiral-shaped periphery. The relative rotation of the two members 91,92 is limited by stops 102,102' of the member 51 or, respectively, 103,103' of the member 92. In that position of the two members 91,92 in which the stops 102,103 engage each other, also the front end 104 of the section 101 (FIG. 5) engages a lateral surface 105 of a thickening of the member 91. The angle for which the two members 91,92 can be swivelled relative to each other, amounts approximately to 50°, however, if desired, it can be made greater without any problem, if this is desired with respect to the present requirements.

In order to rotate the two members 91,92 constituting the restricted guidance 46 for the pistons 43, also relative to each other, the two members 91,92 are fixed to concentric shafts 107, 108 (FIG. 2), from which the shaft 107 is a hollow shaft guiding the shaft 108. The linkage means 44 (FIGS. 1, 2) moving the pistons 43 is guided in the restricted guidance 46 of the two members 91,92, and for this a roller 109 runs in the curved path 45 which roller is bearingly supported for rotation on the one end of a swivel lever 110 (FIG. 2), the other end of which is rigidly mounted on a shaft 111 bearingly supported for rotation in the two side walls 112 of the drum 2. For each piston 43, the shaft 111 carries a swivel arm 113, the free end of which is hinged by a hinge member 114 to the inner end of the piston 43.

The two shafts 107, 108 extend concentrically in the shaft 66 of the drum (FIG. 2) outwardly and are there effectively connected to the drive means 47. For this, the drive means 47 can be so constructed as this is shown in FIGS. 18 to 20, however, also the embodiment according to FIGS. 9 to 14 may be chosen. This embodiment, however, has not the advantage that the time durations for the advance of the drum and for the kneading process may be chosen differently. As within the embodiment according to FIGS. 18 to 20, for the advance of the drum the output shaft 75 of the motor 7' acts via a crank 54 and a rod 61 hinged thereto on the rocker arm 62 that takes along the drum by means of the spring-loaded catch 63 when the drum ist advanced. Within this, the cam disk 71 keeps the spring-loaded catch 68 out of an engagement with the row of notches 65 so that the drum 2 can be rotated. As soon as the advance of the drum terminated, the roller 70 of the catch 68 slides off the cam disk 71, the catch 68 engages into the row of notches 65 and the drum 2 is blocked. During the stillstand of the drum 2 the two members 91,92 constituting the restricted guided 46 are rotated in common, whereby the pistons 43 are advanced or, respectively, retracted at the single stations. The rotation of the two members 91, 92 may be made by the rocker arm 82, as this is shown in FIGS. 18 to 20, however, within the variant of the construction according to FIGS. 2 to 14, for this purpose a further cam disk 114 of the drive means 47 is provided that is positioned outwardly and is continuously driven via a chain drive 15 by the output shaft 75 of the motor 7'. This cam disk 114 may be positioned on the same shaft as the cam disk 71 and acts with its periphery on a roller 116 bearingly supported on a lever 117 that is rigidly connected with the hollow shaft 107 of the restrictive guidance member 91 (FIG. 2). A friction lining 118 takes along a disk 119 that is positioned on the outer side and connected to the shaft 108 of the restrictive guidance member 92. The backward rotation of the members 91,92 is braked by a brake lining 119 which is positioned on the member that stillstands during this backward rotation and plays the roll of a ratched wheel carrying the row of notches 65. The end of the swivel motion of the lever 117 is shown in FIG. 14. At this moment, the cam disk 114 slides off the roller 116 and the backward motion of the lever 117 into the starting position shown in FIG. 10 starts under the action of the advance movement of the drum 2, because via the brake lining 119 and the friction lining 118 also the members 91,92 and, therefore, the lever 117 are taken along, when the row of notchers 65 is rotated for the advance of the drum 2.

By the shape of the periphery of the cam disk 114, the angular velocity of rotation of the restricted guidance 46 for the pistons 43 can be influenced at choice, so that always optimal kneading conditions are ensured.

An additional catching of the disk 120 by the lever 117 during the phases of weighing, kneading and deposition can be obtained by means of a pinion 122 meshing with a toothed ring 121 of the disk 120, which pinion is bearingly supported for rotation on an extension 123 of the lever 117 and carries a handwheel 124 for adjustment. This pinion 122 meshes with a further pinion 125 that is bearingly supported on the extension 123 and adjusts a potentiometer 126 on which the measured weight adjusted by means of the handwheel 124 is indicated by means of a display (see also FIGS. 7, 8).

In the FIGS. 7 and 8 it is shown how by rotation of the one member 92 forming the restricted guidance 46, the conditions at the portioning station 14 with respect to the volume of the dough pieces to be portioned there, can be changed between a maximum (FIG. 7) and a minimum (FIG. 8), without that this change influences the conditions at the kneading station 24 and at the deposit station 39. The possibility of a stepless change of the portioned dough volume is obtained by the spiral-like shape of a section 45' of the curved path 45 in the member 92, which section 45' extends from the outer periphery of the member 92 up to a central hub 127 thereof.

FIGS. 15 to 17 show an embodiment variant for the construction of members 91,92 constituting the restrictive guidance 46 and being movable relative to each other. The curved path 45 which here has been shown excessively strong for clarification's sake, extends in two members 91,92, both of them having substantially the shape of a section of a circle and being connected to each other in the region of the periphery by means of a hinge 128. Here, the adjustment is not done by rotation of the two members 91,92 relative to each other, as this was the case within the embodiment according to FIGS. 7 and 8, but by a relative swivel of the two members 91,92, and for this the one member 92 is provided with teeth 129 extending along an arc of a circle, the center of this arc of a circle being positioned in the axes of the hinge 128. These teeth 129 mesh with a pinion 130 bearingly supported on the other member 31 and rotatable from the outside, for example by .leans of the handwheel 124 (FIGS. 2,16). As FIG. 16 shows, there is in this case a construction for the bedding of the two members 91,92 of the cam disk that is somewhat modified with respect to FIG. 2, since the member 92 is taken along via the hinge 128 if the member 91 is rotated.

In order to facilitate cleaning of the members of the apparatus that are in contact with the dough, all movable members being positioned within the filling shaft 9, namely the two star rollers 11, the two brushes 18,20 of the flouring device 16 as well as the pusher member 6, are dismountable in a simple manner from the filling shaft 9 in the same direction (arrows 376, FIG. 29). For this, the filling shaft 9 has a detachable wall 352 (FIG. 28) that extends perpendicularly to the axes of the star rollers 11, which wall covers the area of the pre-portioning device 10 and of the flouting device 16 so that after removal of this wall 352 these two devices 10,16 are free for access. The two star rollers 11 as well as the two roller-shaped brushes 18,20 are detachably connected to their driving shafts by means of pin and socket rapid connections 354, and, after detachment of these connections 354, they can be pulled out of the filling shaft 9. There are two possibilities for such a pin and socket rapid connection 354 shown in FIG. 29. The one possibility is shown for the star rollers 11 and for the upper disposed dosing brush 18. These members have sleeves 353 attached on the respective driving shafts 355. The coupling for rotation is made by catches 356 formed by radial pins engaging slots 357 of the sleeves 353. The other possibility is shown for the lower disposed distributing brush 20: This brush 20 has a central shaft 358, the two ends of which are provided with extensions 359, 360. That extension 359 that does not face the pin and socket rapid connection 354, is bearingly supported in a bearing 361 (FIG. 28) of the detachable wall 352. The other extension 360 can be coupled with the driving shaft 355 of the distributing brush 20, and this by the features that this extension 360 can be inserted into the end forming a stub 362 of the driving shaft 355 and can be coupled for rotation by means of a catch 356 formed by a radial pin that engages a slot 357 of the stub 362.

For securing the engagement position of these members, ball-catches (not shown) may be provided.

Another construction has been chosen for the pusher member 6: On its end not facing the drum 2, the pusher member has a recess 131 open to below which is also open towards that side which is directed opposite to the side of detachment. In this recess 131 (FIGS. 28,29) engages the upper end of the one part 132 of a two-part rocker lever 134 (FIG. 1) for forming a rapid connection 378, the lower part 133 being bearingly supported for swivel motion around a horizontal axis 136 in the framework 1. The two parts 132,133 of the rocker lever 134 are connected to each other by means of the tension spring 8 so that the force required for pressing the dough into the receiving openings 3,4 can be exerted onto the pusher member 6, however an excessive crush of the dough is avoided. The upper end of the rocker lever part 132 engaging the recess 131 is provided with a roller 139 engaging the wall 369 of the recess 131 that neighbours the drum 2. The rocker lever part 132 protrudes through a slot 137 of the bottom wall 138 of the guide means 379 for the pusher member 6. That sidewall 372 of the guide means 379 of the pusher member 6 disposed on the same side as the detachable wall 352, can be swivelled down around a horizontal axis 373 mounted on the framework 1. The downwardly swivelled position is shown in FIG. 28 by dotted lines, the vertical operation position by full lines. For securing the operation position, a quick connection 379 is provided that can be actuated by a lever. Also for the wall 352 such a quick connection 374 may be provided (FIG. 28). The lower end of the wall 52 may be inserted into a U-shaped seat 375 and thereby may be secured in the operation position. In such a manner, the wall 352 is easily detachable after detachment of the quick connection 374.

Also for the cleaning brush 48 a similar detachment possibility may be provided, what is schematically shown in FIG. 29. This cleaning brush 48 may be accessible by the features that a further, in FIG. 29 not shown part of the wall of the housing is detachable in a similar manner as this is shown for the wall 352, which further wall part is disposed in front of the brush 48. Alternatively thereto, the downwardly swivelable sidewall part 372 may extend up to the region of the cleaning brush 48.

Suitably, this detachable wall portion 352 extends so far that it reaches also in the region of the shearing edge 23 that is provided on a conical plate 314 (FIG. 1) consisting of food-consistent synthetic plastics material and confines the lowermost section of the filling shaft 9 that neighbours the drum 2. This enables one to pull also the conical plate 314 in direction of the arrows 376 (FIG. 29) out of the framework 1, so that the conical plate 314 can easily be cleaned, which arrows indicate the direction of detachment of the members connected to the driving shafts 55.

The cleaning of kneading device 25 or, respectively, of the kneading tool 29 cooperating with the dough is facilitated by the fact that the entire kneading device 25 can be swivelled away from the drum 2 in direction of the arrow 377 (FIG. 1) around the axis 26 of the framework 1.

Suitably, the detachable or, respectively, downwardly swivelable wall portions 352, 372 are disposed at the operator's side of the machine so that the machine is accessible for cleaning from the operation side.

In FIGS. 23 to 26 the already mentioned change of the radius of the circular movement of the kneading tool 29 is shown more in detail. This adjustment is made by rotation of the second eccentric pin 33 by means of the tiller 37. The radius of the circular motion of the kneading tool 29 is at its maximum, if the eccentricities of the two excenter pins 31,33 show towards the same direction, and it is at its minimum if these two eccentricities are directed opposite to each other. For adjustment of this eccentricity, the seat 34 for the second eccentric pin 33 has an enlargement 252 at its upper end (FIG. 23) in which an enlarged head 140 of the eccentric pin 33 is positioned. Thereby, this eccentric pin cannot downwardly fall out of the seat 34. On its upper surface, the head 140 has a transverse groove 154 into which engages a fin 141 provided on the lower end of a pin 256 connected to the tiller 37, which pin is pressed downwardly or, respectively, towards the transverse groove 254 by a spring 142. If the fin 141 is lifted against the action of the spring 142, the disk 32 connecting the two eccentric pins 31,33 together with the two eccentric pins 31,33 can be rotated relative to the driving shaft 35. By a rotation for 180°, the maximum adjustment possibility for varying the effective eccentricity is obtained. In the operation position according to FIGS. 23,24, this eccentricity e (FIG. 24) is a maximum, in the operation position according to FIGS. 25, 26 a minimum. The eccentric pin 33 is coupled for rotation to the driving shaft 35 by a pin-shaped protrusion 144 (FIGS. 24,26) that extends laterally from the fin 141 and engages one of two notches 259, according to the position of rotation of the eccentric pin 33. If also intermediate amounts of the eccentricity e are to be adjusted, more than two notches 259 are to be provided.

In order to avoid that the kneading tool 29 rotates together with the driving shaft 35, a straight-line motion mechanism 143 (FIGS. 23 to 26) is provided which comprises two rods 269, 270 along which the kneading tool 29 is guided by means of slide bearings 271, 272.

The invention is also applicable to such apparatus in which only a kneading process, but not portioning process takes place, since already portioned dough pieces are put into the receiving openings, for example by means of a supply conveyor belt. In this case, the invention ensures the advantages that the kneading conditions can be varied at choice without that this has any influence upon the conditions at the deposit station 39. On the last-named station it is of importance for safety's sake, that the pistons 43 always are flush with the periphery of the drum 2 so that one cannot grasp into the receiving openings 3 or, respectively, 4. Of course, this advantage can also obtained within the other, above mentioned kinds of the apparatus.

The principle according to the invention can be extended without any problem to more than two members constituting the restricted guidance 46, so that also complicated conditions of motion of the pistons 43 at the single treatment stations 14,24,39 can be taken into account. Of course, also at the lower peripheral portion of the drum 2 a further treatment station can be disposed, for example a station at which the empty receiving openings 3,4 are cleaned and, respectively, or are oiled and, respectively, or are floured.

Also other kinds of apparatus are possible in which a treatment of the dough different from kneading or, respectively, portioning takes place, as long as within this kind of apparatus a movement of the piston in its receiving opening is of importance.

As FIGS. 27 shows, the filling shaft 9 can be closed to above by a safety cover 146. If this safety cover 146 is swivelled to above for filling in the dough 147, it disengages a safety switch 148 which blocks the drive means of the pre-portioning device 10. Thereby it is avoided that the operator can be injured by pre-portioning device.

A change of the dough volume for each receiving opening 3,4 can be obtained by more or less retracting the piston 43 at the portioning station 14 by the rotation of the restriced guidance 46. For this, an adjustment gear (not shown) may be provided by which the starting position of the rotation of the restricted guidance 46 with respect to the drum 2 can be varied.

Further, a transfer roller may be disposed at the deposit station 39 between the deflection roller 41 and the drum 2, which transfer roller suitably rotates permanently so that a premature start of the run of the deflection roller of the conveyor belt 40 is not necessary. Therefore, this deflection roller may be driven by the drum 2 via a chain drive.

We claim:

1. An apparatus for kneading portioned dough pieces comprising:
   a frame;
   a rotatable drum having an outer periphery, said drum being supported by the frame and rotatable about a horizontal axis in a predetermined direction, said drum having receiving openings disposed on the periphery of the drum, said receiving openings being equally spaced apart from each other along the periphery of the drum, said receiving openings being provided in at least two different sizes alternating with each other along the periphery of the drum;
   drive means for rotating the drum in a stepwise fashion;
   a filling station, positioned proximate to the drum, for depositing a dough piece into the receiving opening;
   a kneading station positioned proximate to the periphery of the drum and displaced with respect to the filling station in the direction of rotation of the drum, each receiving opening being adapted to be positioned proximate the kneading station;
   at least one kneading tool positioned at the kneading station for kneading the dough piece within the receiving openings;

means for rotating the kneading tool in a circular motion, said rotating means comprising an eccentric pin for rotating the kneading tool in the circular motion, said eccentric pin being adapted to vary the eccentricity of the kneading tool;

a deposit station positioned proximate to the periphery of the drum and displaced relative to the kneading station in the direction of rotation of the drum, said deposit station being adapted to eject the kneaded dough piece from the receiving openings of the drum;

a piston positioned within each receiving opening and movable within a radial direction with respect to the drum for ejecting the dough piece from the receiving opening;

guide means formed in the drum controlling the movement of each piston within its respective receiving opening;

said drive means being adapted to rotate the drum so that receiving openings of the same size are rotated to the filling station, kneading station and deposit station; and switch-over means for rotating the drum between a position in which receiving openings of one size are proximate the filling station, kneading station and deposit station, to a position in which receiving openings of another size are proximate the filling station kneading station and deposit station, the arrangement being such that a receiving opening of one size is always proximate the filling station.

2. The apparatus according to claim 1, said drive means for the drum having a catch cooperating with a row of notches corresponding to the steps of the drum, said catch being loaded by a spring, and that the catch can be uncoupled by the switch-over means for certain times, preferably for a fraction of a step of the drum corresponding to the number of sizes of the receiving openings.

3. The apparatus according to claim 2, said switch-over means comprising a tappet acting on the catch and guided within the frame, said tappet acting against the action of a spring.

4. The apparatus according to claim 3, the catch comprising a nose for the resetting the tappet.

5. The apparatus according to claim 1, the eccentricity of the eccentric pin relative to the driving shaft being adjusted by means of a quick adjustment device carried by the kneading device, said quick adjustment device having notches.

6. The apparatus according to claim 5, the driving shaft having a seat for receiving therein a second eccentric pin, the seat extending in an axial direction of the driving shaft, eccentric to its axis, the second eccentric pin carrying the first eccentric pin eccentric to its axis and is adjustable and fixable in its rotation position with the seat.

7. The apparatus according to claim 6, the second eccentric pin being connected for rotation on its end not facing the first eccentric pin to a handle for adjustment, said handle being disposed at a side of the kneading station that does not face the kneading tool.

8. The apparatus according to claim 7, the driving shaft or the second eccentric pin being provided with at least one notch for fixing the rotation position of the second eccentric pin.

9. The apparatus according to claim 7, a spring being provided for pressing a fixing, member into one of at least two notches allocated to different positions of rotation of the second eccentric pin.

10. The apparatus according to claim 1, the pistons being guided on a curved path of restricted guidance which path being adjustable relative to the drum at least in the intervals of movement of the advance of the drum, said curved path comprising at least two sections adjustable relative to each other and being provided on members of the restricted guidance that are adjustable relative to each other.

11. The apparatus according to claim 10, the members carrying the sections being rotatable relative to each other around a common center.

12. The apparatus according to claim 10, the members carrying the sections being connected to each other on the periphery by a hinge, said members being spread by central teeth.

13. The apparatus according to claim 10, at least one of the sections comprising an enlargement of the curved path that is overlapped by the other section.

14. The apparatus according to claim 10, at least one of the sections extending in a form of a spiral from the periphery of the member towards the center thereof.

15. The apparatus according to claim 10, said drive means for rotating the restricted guidance comprising a curved disk on a curved guiding path from which the rotation of the restricted guidance is derived.

16. The apparatus according to claim 15, the curved disk driven for rotation adjusting a lever acting on at least one shaft that is connected with the members carrying the curved path sections.

17. The apparatus according to claim 15, said drive means for the drum and for the restricted guidance comprising a curved path from which as well the advance movement of the drum and of the restricted guidance as the backward movement of the restricted guidance relative to the drum are derived, wherein the duration of each step of movement of the drum is shorter than the intervals therebetween.

18. The apparatus according to claim 17, a member being mounted on the output shaft of a motor, said member moving the curved path, said curved path being connected by means of a linkage means to a rocker arm moving the drum and being positioned on the axis of the drum.

19. The apparatus according to claim 1, at the deposit station, a conveyor belt for carrying off the dough pieces from the drum being provided, said conveyor belt being driven prematurely with respect to the backward movement of the restricted guidance relative to the drum and to the ejecting movement of the pistons.

20. The apparatus according to claim 1 further comprising a filler shaft, the pre-portioning means including two inversely moved star rollers, a flouring device including two roller-shaped brushes, and a cleaning brush for the drum engaging a lower periphery portion of the drum.

21. The apparatus according to claim 20, a safety cover being provided above the filler shaft for the dough, said cover in its lifted condition disengaging a safety switch that blocks the drive means of the pre-portioning device.

22. The apparatus according to claim 20, the filler shaft and the frame of the apparatus comprising at least one detachable or swivelable wall portion, whereby upon removing said detachable or swivelable portion, said pre-portioning means and pusher member pressing in the dough can be pulled out of the frame.

23. The apparatus according to claim 22, a sidewall of the filler shaft extending perpendicularly to the axes of two pre-portioning means moving in directions opposite to each other around horizontal axes and supplying the dough, and on the same side disposed sidewall of a guide means of a press-in-tool having a pusher member provided at the portioning station, being removable, said pre-portioning means being detachably connected to their driving shafts and after detachment of this connection can be pulled out of the filler shaft, and that the press-in-tool, in particular the pusher member, being connected to its drive means by means of a rapid coupling that after removal of the lateral wall of the guide means of the press-in-tool can be uncoupled by pulling out the press-in-tool in the same direction.

24. The apparatus according to claim 23, after removal of the side wall of the filler shaft, said brushes of the flouring device being free to access and being adapted to be pulled off from its driving shaft in the same direction as the pre-portioning means.

25. The apparatus according to claim 23, said preportioning means being connected to respective driving shafts by rapid pin and socket connections.

26. The apparatus according to claim 23, the preportioning means and the brushes of the flouring device comprising sleeves that can be placed onto the driving shafts and are connected for rotation by catches to these driving shafts and can be pulled off from the driving shafts.

27. The apparatus according to claim 26, the pusher member being detachably coupled with a rocker lever of its drive means disposed below the pusher member, said rocker lever being coupled with the pusher member by inserting an upper end of the rocker lever in a recess of the pusher member that is open to below and to a side that is opposite to the pulling-off side.

28. The apparatus according to claim 27, the upper end of the rocker lever carrying a roller which engages a wall of the recess.

29. The apparatus according to claim 23, the preportioning means and the brushes of the flouring device comprising shafts connectable for rotation with the driving shafts having studs, said shafts being connectable by pin and socket connections having catches.

30. The apparatus according to claim 29, an end of the respective shaft that does not face the pin and socket connection being bearingly supported with an extension in a bearing of the wall of the filling shaft that can be detached or swivelled off.

31. The apparatus according to claim 23, said cleaning brush engaging the drum being adapted to be pulled off in the same manner as the brushes of the flouring device.

32. The apparatus according to claim 23, a shearing edge of a conical plate neighbouring the drum being adapted to be pulled out of the frame in the same direction as the press-in-tool.

* * * * *